(12) United States Patent
Landreth et al.

(10) Patent No.: US 7,821,446 B2
(45) Date of Patent: Oct. 26, 2010

(54) UNSWITCHED, ULTRA LOW POWER, LONG RANGE RADAR SYSTEM

(75) Inventors: Rodney V. Landreth, Helotes, TX (US);
William D. Davis, Mico, TX (US);
Robert W. Robison, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 98 days.

(21) Appl. No.: 12/398,787

(22) Filed: Mar. 5, 2009

(65) Prior Publication Data
US 2010/0225529 A1 Sep. 9, 2010

(51) Int. Cl.
*G01S 13/08* (2006.01)
(52) U.S. Cl. .................. 342/132; 342/118; 342/120; 342/175
(58) Field of Classification Search .......... 342/118, 342/123, 132, 175
See application file for complete search history.

(56) References Cited

U.S. PATENT DOCUMENTS

| 5,337,054 A * | 8/1994 | Ross et al. ............ 342/93 |
| 2002/0154052 A1 * | 10/2002 | Fehrenbach et al. ....... 342/124 |

* cited by examiner

*Primary Examiner*—Thomas H Tarcza
*Assistant Examiner*—Timothy A Brainard
(74) *Attorney, Agent, or Firm*—Ann C Livingston

(57) ABSTRACT

An ultra low power, long range, robust radar system, for applications such as ionospheric sounding. The HF transmit signal and the received (reflected) signal are both unswitched and high frequency and share a path to a common loop antenna. The transmit signal originates at a local oscillator (LO), and is sufficiently low power to not saturate the receive signal path. A balun divides the local oscillator signal between the transmit path forward to the antenna and a mixer path, and also divides the received signal between the mixer path and the LO path. A mixer converts the mixed LO and received signal to baseband.

20 Claims, 5 Drawing Sheets

UNSWITCHED, ULTRA LOW POWER, LONG RANGE RADAR SYSTEM

TECHNICAL FIELD OF THE INVENTION

This invention relates to long range radar, and more particularly to a system that uses an unswitched shared path for transmission and receiving and that reduces the size, weight, and power requirements for acquiring useful data.

BACKGROUND OF THE INVENTION

"Ionospheric sounding" is a technique used in telecommunication and radio science applications. It provides real-time data on high-frequency ionospheric-dependent radio propagation.

An ionospheric sounding system has a synchronized transmitter and receiver. The time delay between transmission and reception is translated into effective ionospheric layer altitude.

"Vertical incident" (VI) ionospheric sounding uses a collocated transmitter and receiver, and involves directing a range of frequencies vertically to the ionosphere and measuring the values of the reflected returned signals to determine the effective ionosphere layer altitude.

Current applications of ionospheric sounding systems fall into two categories. A first application is for support of operational systems, such as shortwave (HF) radio communications and over-the-horizon (long range, ionospheric reflection) radar systems. This support can be in the form of predicting propagating frequencies at given times and locations or providing of real-time data representing current conditions so that system operating parameters can be optimized. Another application is for scientific research to enable better prediction of ionospheric conditions and better understanding of plasma physics of the Earth's atmosphere.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to long range radar, and more particularly to a system that uses an unswitched shared path for transmission and receiving. The system reduces the size, weight, and power requirements for acquiring useful data. The approach described herein is robust and can be exploited in high power designs for numerous applications.

Figure 1:
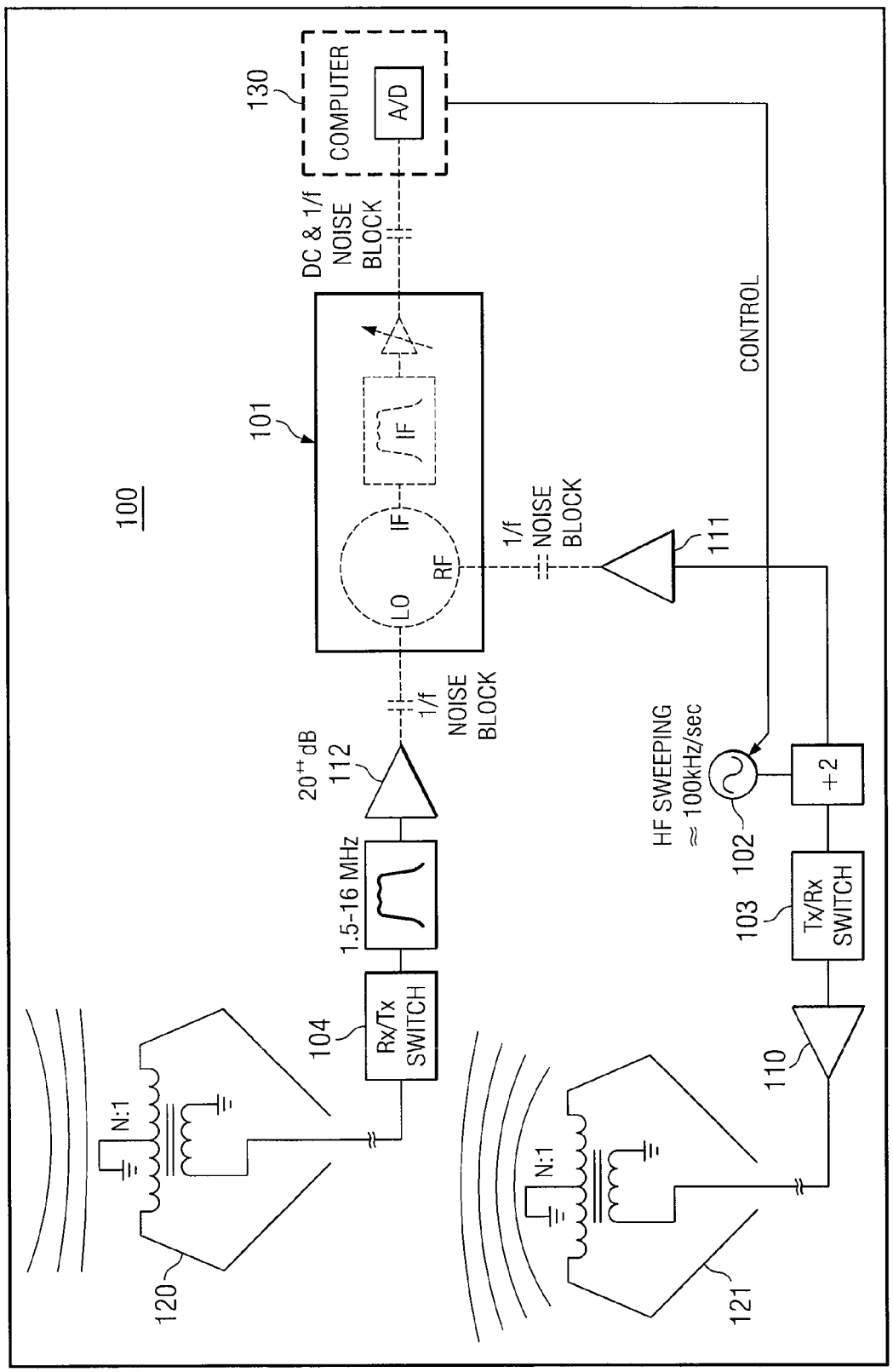
FIG. 1 illustrates a conventional switched high power ionospheric sounding system.

FIG. 1 illustrates a conventional vertical incidence (VI) ionospheric sounding system 100. System 100 implements a switched (chirp) high transmit power frequency modulated continuous wave (FM/CW) high frequency (HF) method of ionospheric sounding.

A local oscillator (LO) 102 is a transmitter exciter, and sweeps in frequency at a typical rate of about 100 kHz/second. A Tx/Rx switch 103 is in the transmit path, and an Rx/Tx switch 104 is in the receive path. Antennas 120 and 121 are high-gain broadband VI HF antennas. In the example of FIG. 1, receiver 101 is a super heterodyne receiver.

The transmitted signal propagates up into the ionosphere and is reflected back under the right ionospheric conditions. The reflected signal is offset (behind) in frequency from the LO frequency by about 200±180 Hz depending on the effective height of the ionosphere. This offset in frequency is measured and the effective height is calculated.

The Tx/Rx switched design of system 100 is based on the following assumptions. One assumption is that more transmit power increases the fidelity of the measured reflection. A power amplifier 110 in the transmit path provides power amplification in the 10-100 watt range. System 200 also has RF amplifiers 111 and 112 into receiver 101.

Another assumption in the design of system 100 is that to keep from saturating the receiver, the Tx and Rx periods cannot overlap. However, this feature of system 100 reduces the available integration time during the receive period.

Because the height of the ionosphere is not known, the switch rate cannot be pre-optimized for the best (longest and most frequent) integration times for a given height (range). One of two approaches is most often used; specifically, the ionosphere is assumed to be at its highest and delay is longest, or a pseudorandom switch rate is used to occasionally receive a self-interference free echo.

The sensitivity of system 100 is limited by the short integration time and the ringing of switching transients versus the RF noise figure (NF). Insufficient time-constant settling (vs NF) limits sensitivity by about 3 orders of magnitude. At a typical height of 300 km (600 km round trip), the receive signal is incident only 2 ms after the transmitter is switched off. This is less than 3 time-constants (3 ms) in a relatively large 1 kHz measurement bandwidth. The desired/typical measurement FFT bin or resolution bandwidth (RBW) is a few Hertz or less.

The receive channel Rx/Tx switch 104 internally generates in-band broadband switching transients similar to an impulse function. These get amplified (often saturating the channel) and ring for several time constants. This ringing may swamp all but the strongest of echoes by many orders of magnitude. Thus large transmit power is required.

The transmit power required to receive an echo above the transients is typically medium to high (10's to 100's) Watts. This raises a risk of intercept by enemy forces and interference with other radios. Numerous exclude bands are required to reduce interference with known broadcast signals, thus creating time and frequency gaps in the desired echo. More complicated spread spectrum techniques have been employed to add low-probability-of-intercept operation.

Similarly, the transmit channel Tx/Rx switch 103 generates broadband transients which are amplified and broadcasted, raising local broadband interference (noise) level by several orders of magnitude.

Receive channel front end RF gain and baseband/IF gain are often high to overcome the following: ringing transients, which are most often fixed (independent of gain or transmit power) by absolute receive channel compression/saturation, so more gain (or transmit power) does typically provide higher quality reflections; conversion (and other) losses; and quantization noise of the 8-16 bit A/D. Other sources of baseband noise and interference include 1/f noise and 60 cycle hum.

The gain associated with system 100 reduces its high-end dynamic range and can be problematic, especially in the cluttered HF spectrum. In a desired near 1 Hz FFT bin, the distortion floor will likely be encountered above the NF noise floor, thus analog gain can be counter productive. (Every 1 dB of gain raises the distortion floor 2-3 dB.)

Using system 100, only the effective height of the ionosphere can be measured. More complicated implementations are required, with modulation and additional processing, to measure other parameters like Doppler shift.

Variations of system 100 can be implemented with multiple coherent receive channels with a connected array of antennas to measure tilt of the ionosphere. This design is especially useful for correcting near vertical incidence (NVI) DF bearings.

Figure 2:
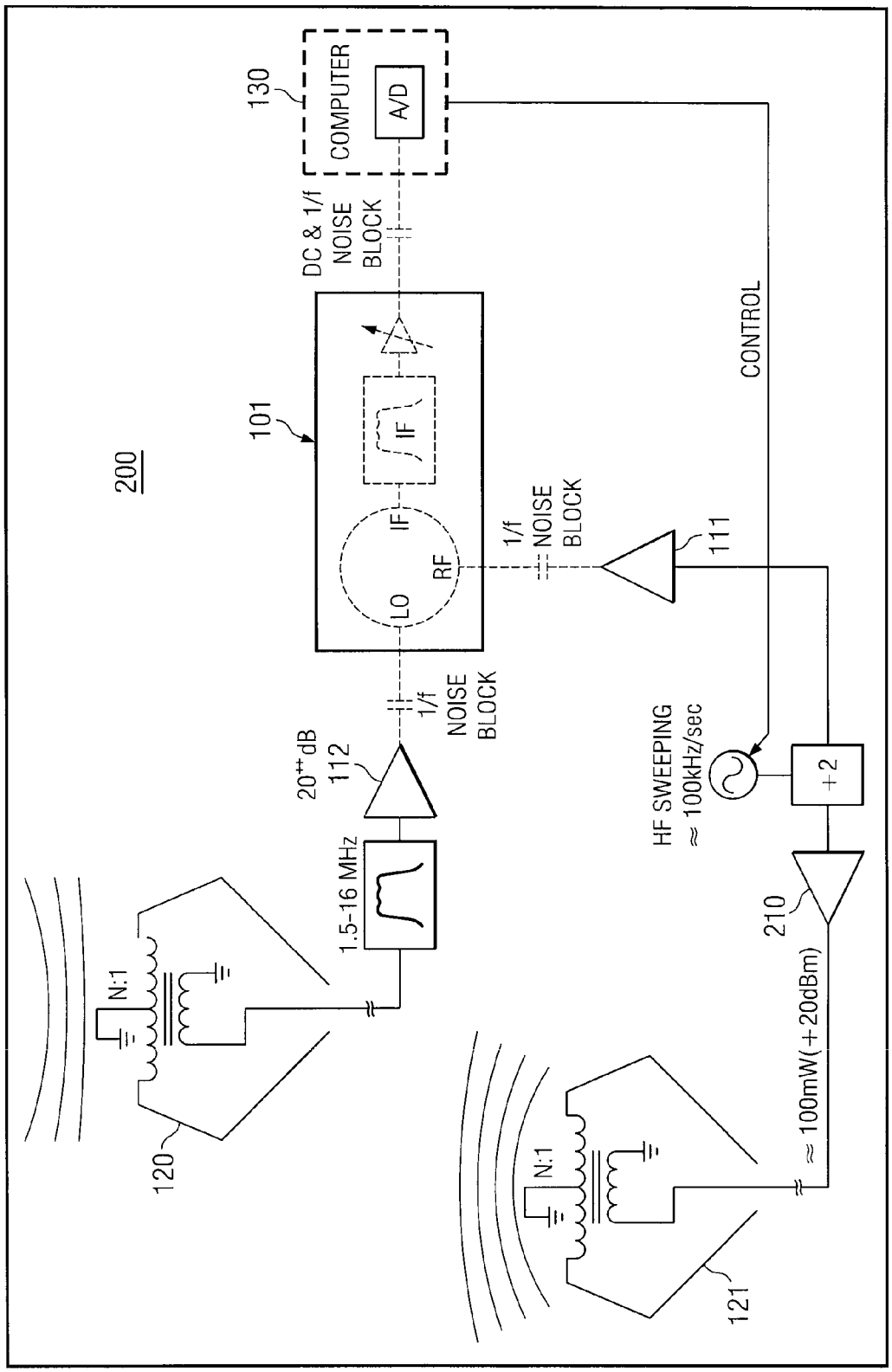
FIG. 2 illustrates the system of FIG. 1, modified to provide an unswitched very low power (VLP) method for ionospheric sounding.

FIG. 2 illustrates an ionospheric sounding system 200 that implements an unswitched method for FM/CW VI ionospheric sounding. System 200 is referred to herein as a very low power (VLP) system.

The operation of system 100 has many similarities to the operation of system 100, and in fact, is a modification of system 100 to eliminate switching. Elements of system 100 and system 200 that are alike are numbered similarly. As in system 100, system 200 has a transmit signal originating at local oscillator 102 having a high frequency sweep with a rate in the order of 100 kHz/second.

However, one principle underlying the design of system 200 is that because propagation and other losses may average only about 50 dB, which is well within the dynamic range of well designed receivers, switching is not required. All that is required is reduction of transmit power below that required to keep the direct path signal from saturating the receiver 101.

Thus, system 200 has no Tx/Rx or Rx/Tx switches. Broadband switching transients and interference are eliminated from both transmit and receive paths, making the transmitted signal spectrally clean. The receive/integration time is 100%.

The transmit power amplifier 110 of system 100 is replaced with a general purpose RF amplifier 210. The transmit gain is thereby reduced (a little below that required) to keep the direct path signal from saturating the receiver. The resulting gross forward power measures about 100 mW (+20 dBm). Thus, the transmit power required to measure quality ionograms is reduced from an average of 50 Watts for a conventional system 100 to 0.1 Watts for system 200, a 27 dB reduction.

At such low transmit power levels, detection and exploitation by other non-coherent, uncooperative resources is less likely.

Receiver 101 is a super heterodyne receiver, but could easily be replaced with a direct conversion to baseband mixer. With the later approach, the direct path signal out of the mixer is near DC, which is easily blocked with a capacitor. This would allow raising the transmit power for improved ionograms, such as may be needed at locations with high on-air interference or for other RADAR applications.

Processing system 130 has an A/D converter, and appropriate processing devices and memory, known in the art of ionospheric sounding data processing. In an experimental implementation, a consumer grade 16-bit sound card was used for A/D conversion, but a higher quality 24-bit A/D unit would greatly improve instantaneous dynamic range.

Figure 3:
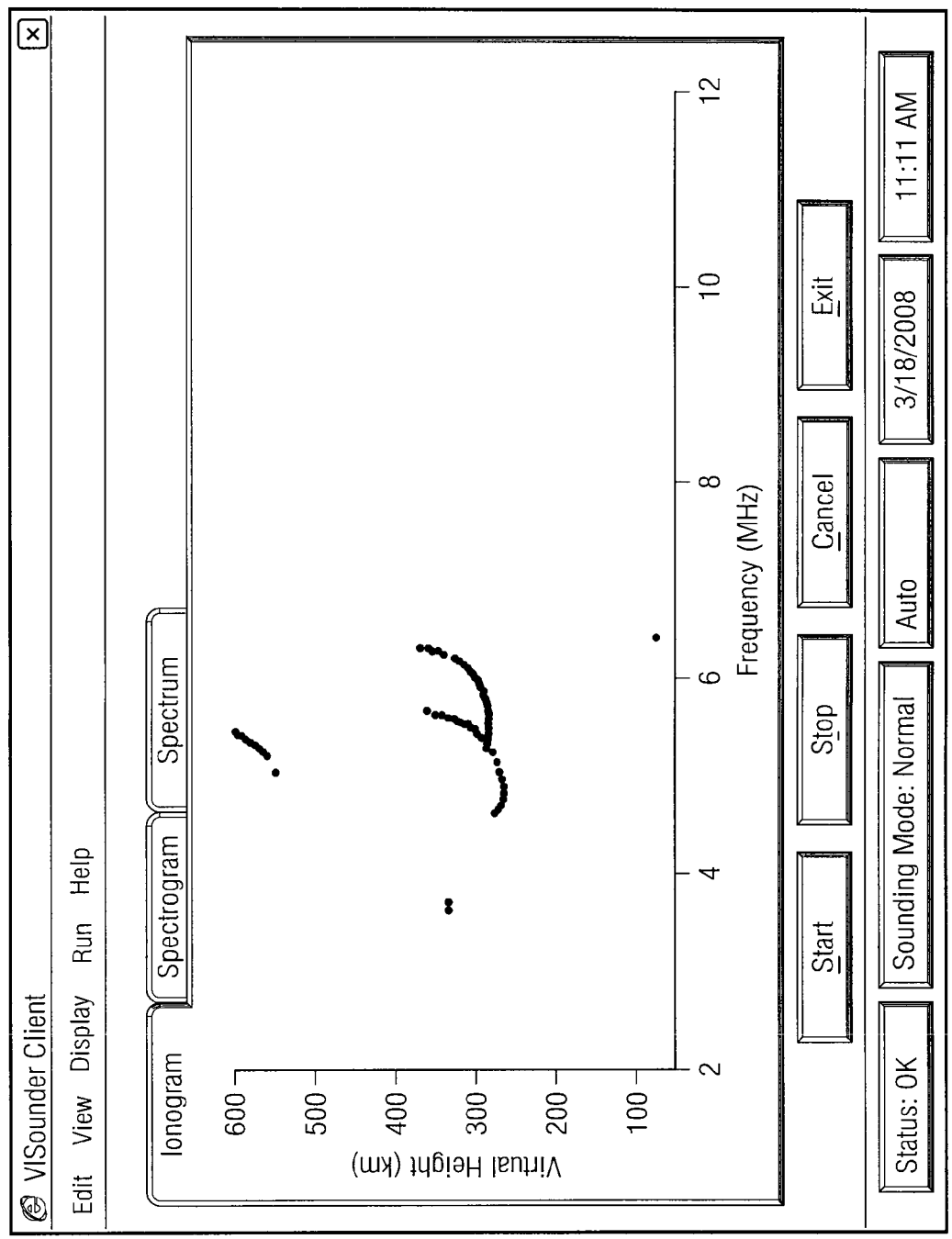
FIG. 3 illustrates an ionogram acquired with data from the system of FIG. 2.

FIG. 3 is a double hop ionogram recorded with system 200 with a sweep rate of 100 kHz/second. As illustrated, processing system 130 processes the input data to provide a measure of effective height of ionospheric layers. In an "ionogram" each ionospheric layer shows up as an approximately smooth curve. Each layer is separated from the next by an asymptote at the critical frequency of that layer. The critical frequency of each layer is scaled from the asymptote, and the virtual height of each layer is scaled from the lowest point on each curve.

It should be noted that system 200 may have cascade and other design issues that limit its dynamic range. One implementation of system 200 provided a Minimum Detectable Signal (MDS) that measured around −75 dBm at receiver preamp input.

With wider dynamic range designs, it should be possible to further reduce the transmit power and still measure quality ionograms. Because integration time can be as long as desired, sensitivity should only be limited by broadcast interference (and distortion from same) and/or perhaps by LO phase noise.

Figure 4:
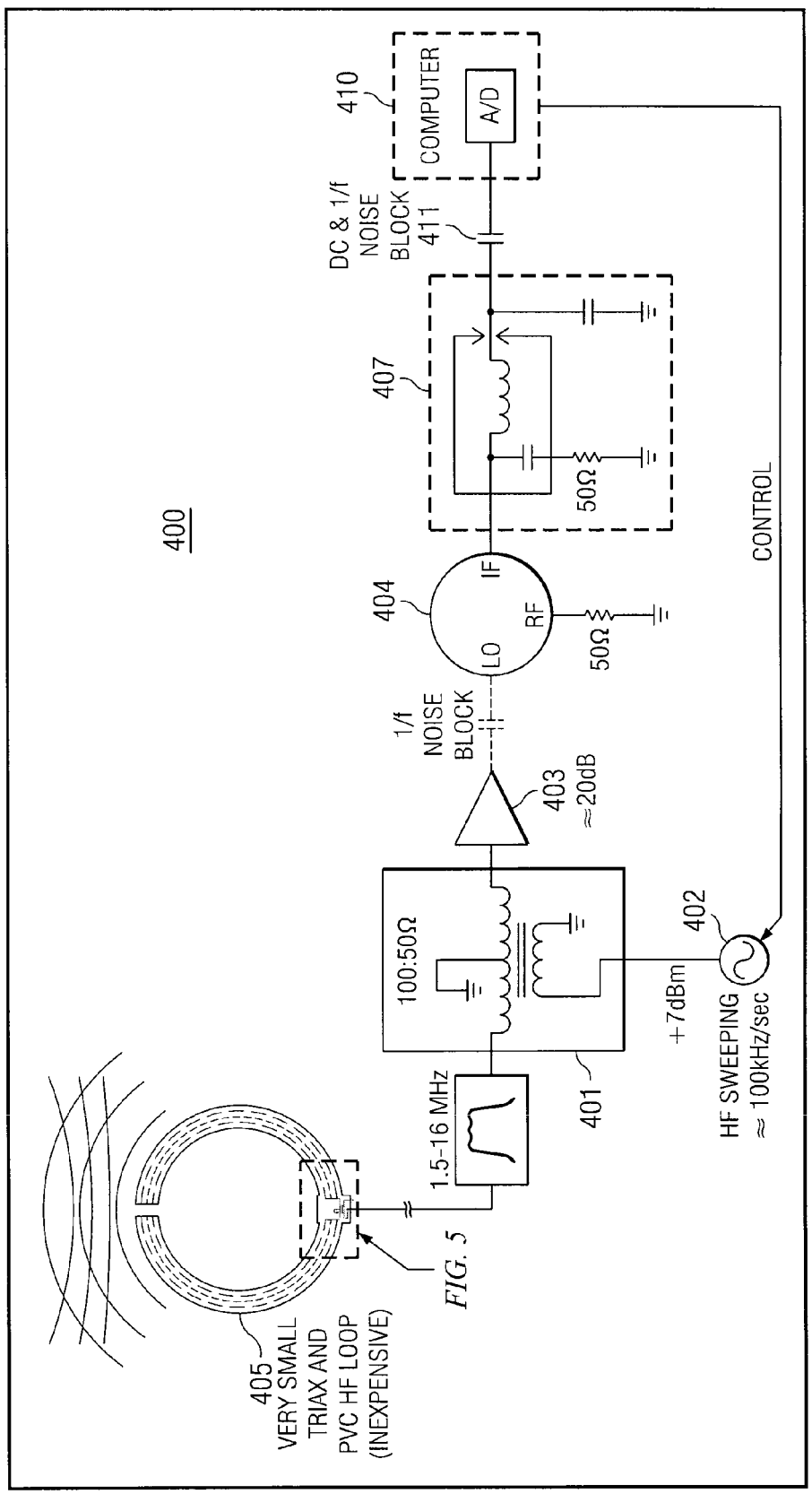
FIG. 4 illustrates an advanced unswitched ionospheric sounding system having an ultra low power design.

FIG. 4 illustrates another implementation of an unswitched ionospheric sounding system 400. As explained below, system 400 is referred to herein as an ultra low power (ULP) system. As explained below, the various design options of system 400 are profoundly robust, compact, and simple.

The ULP design of system 400 lends itself to use of a very small broadband HF loop antenna 405, and provides the ability to simultaneously transmit and receive on the same antenna element(s). In this example, an HF loop antenna 405 internally driving (and driven by) very low impedance is utilized. This HF loop antenna 405 will exhibit a nearly flat frequency response (in terms of an antenna correction factor).

Local oscillator 402 provides an HF sweep signal at a rate in the order of 100 kHz/second. The signal power out of oscillator is about +7 dBm.

A 50/100Ω balun 401 divides the local oscillator 402 between the antenna transmit and mixer paths. Balun 401, unlike a power divider with isolated ports, also divides the received antenna signal between the desired mixer path and the undesired LO path, but the loss is only an affordable 3 dB.

A single very wide dynamic range (low NF with high intercept points) RF amplifier 403 doubles as the preamp for the received echo signal and LO drive amp for the mixer 404.

The LO and received echo signals are mixed, in the same way as if each were connected to respective LO and RF ports on the mixer 404. A high level +23 dBm mixer 404 is used. The RF termination shown is optional.

Mixer 404 is a direct conversion to baseband mixer, versus a more complicated and expensive super heterodyne receiver. Antenna VSWR reflected power is mixed to near DC. The direct conversion approach also facilitates restoring separate transmit and receive channels, if desired for higher power applications. The direct path interference would also be mixed to near DC. DC, however, is out-of-band in the baseband section. DC is easily blocked from A/D with a series 1/f noise/interference block capacitor 411, and so does not occupy or consume any part of the A/D dynamic range. Also, the 24-bit A/D allows minimum gain at the front end RF section, thereby reducing risk of saturation or other interference.

Diplexer 407 receives the baseband signal from mixer 404. It comprises low cost broadband bias-T, external capacitors, and a 50Ω load, and provides diplexer distribution of in-band and out-of-band signals. A signal representing the desired input data is delivered to processing unit 410 via noise block capacitor 411.

Processing unit 410 receives and digitizes the 200±180 Hz baseband signal, using a professional grade 120 dB instantaneous dynamic range sound card with 24-bit A/D conversion. The minimal front end gain of system 400 provides a near 120 dB instantaneous dynamic range. As indicated above, processing unit 410 has appropriate processing devices and memory for programming that analyzes the input data and provides appropriate output, depending on the application of system 400. For example, if system 400 is used for ionospheric sounding, processing unit 410 would be programmed to determine the height of the ionosphere and to generate ionograms. Processing unit 410 is further programmed to provide control signals to local oscillator 402.

Figure 5:
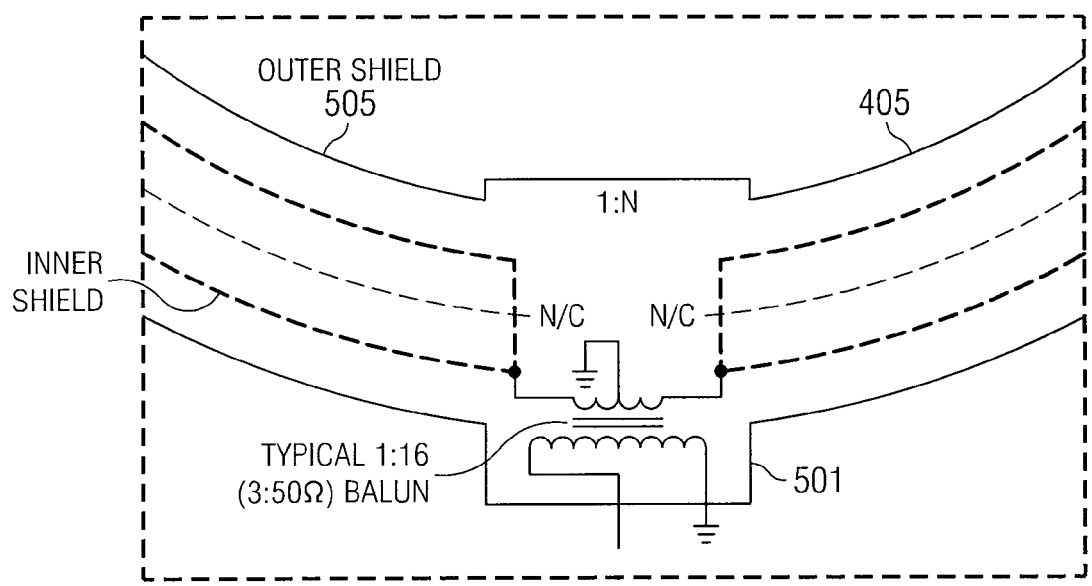
FIG. 5 illustrates a portion of the antenna of FIG. 4.

FIG. 5 illustrates a portion of antenna 405 in further detail. At such low transmit power (+4 dBm at antenna 405), a 50/3Ω (16:1) or similar balun 501 is used to closely match (over a relatively wide bandwidth far below first resonance) impedance of a very small HF loop without high currents burning out the low impedance side of the balun.

To maintain consistent low impedance on the balanced side of the shielded loop, the antenna loop is made from triaxial (vs coaxial) cable. The inner shield 506 is used as the electrical center conductor. The physical typical center conductor is not used. The antenna size is adjusted for the best overall impedance match (over 1.5-16 MHz) for the actual balun used.

Referring again to FIG. 4, for processing unit 410, typically implemented using a DSP, a nominal 1 second integration time is used. This yields a 1 Hz bin (noise power bandwidth). The receiver noise figure (referred to antenna input) is approximately 10 dB. Thus, a received signal out of the antenna at −144 dBm should have 20 dB (S+N)/N. The transmit level is +4 dBm gross forward power. Round-trip propagation and antenna losses are typically less than 70 dB. This yields a typical receiver input level of −66 dBm minimum. Thus, 78 dB (144-66) of margin exist for 20 dB SN. In other words, it should be possible to transmit only −74 dBm (+4−78) and receive a return signal at 20 dB $(S_+N)/N$. In actual practice, however, sensitivity is limited by broadcast (and other manmade) coherent interference (and distortion products from same), which during sweep will be spread out in frequency and appear as incoherent noise that varies greatly over frequency. Regardless, available margin and dynamic range will be forgiving of a few dB loss in the small loop antenna.

A number of options exist to reduce broadcast interference and distortion floor. RF gain can be reduced with a corresponding increase in LO output. Or, amplifier 403 can be moved from the receive/LO path to a location between the LO output and the balun 401. This would raise the transmit level by 20 dB, reduce distortion floor by 40 to 60 dB, and not affect the mixer LO drive level.

Another option is to use an image reject mixer, which operates at the low baseband frequency. This would reduce by half (3 dB) the interference bandwidth. NF would also be reduced from approximately 10 to 7 dB.

Nearly 200 dB of path loss is tolerated with the design approach of system 400. System 400 can be scaled to various frequencies, sweep rates, detection ranges, and radiated power for a large variety of applications in addition to ionospheric sounding. For example, it should be relatively easy to adjust sweep rate and power to see if the moon and/or planes can be detected. If successful, additional adjustments may be able to detect satellites and even asteroids. (Numerous options with restored independent Tx and Rx paths can easily raise Tx power several orders of magnitude. The direct path from the Tx to the Rx antenna can even be constructively used and controlled as the very source of mixer LO power.)

In addition to lowering cost, another performance goal of system 400 is to achieve transmit levels below that limited by the FCC for spurious radiated emissions (RE), thereby eliminating the need for an FCC license to operate. This would permit system 400 to be placed all over the world with very little risk of interference or detection.

Another promising application of system 400 is as a small scale shipboard (tactical) HF surface-wave over-the-horizon (OTH) radar. Sky-wave backscatter OTH and space weather radar may be possible with advanced implementations. Other possible radar applications include ground penetrating radar, asteroid search radar, and futuristic scanning applications.

Features of system 400 are Ultra low (and optionally high) power, size, weight, complexity, and cost, yet high quality, very wide dynamic range, and robust radar technique for a variety of applications. The radiated power required to reliably measure quality ionograms may (in theory) be as low as −74 dBm.

To minimize distortion and noise floors, ultra wide dynamic range components of system 400 are: the 24-bit A/D conversion provided by processing unit 410, the +23 dBm LO level mixer 404, and a very high intercept yet reasonable NF RF amplifier 403.

System 400 can further be optimized for the interference free environment of space. Lower transmit power and lower dynamic range components can be used, thereby significantly reducing weight and DC power requirements. These adjustments make planetary ionospheric exploration practical. All components can readily be hardened for space.

Three simple parallel receive channels with connected array of antennas add DF capability. This embodiment could be used to measure tilt of the ionosphere.

Affordable parallel transceiver channels can be added, each simultaneously sweeping its small portion of the HF band. For example, a single channel sweeping at 100 kHz/sec. takes 2.5 minutes to sweep 1-16 MHz. With 8 channels, each sweeping only 1.875 MHz wide portions, an ionogram could be refreshed every 19 seconds.

Pairs of parallel transceiver channels (one sweeping forward and one sweeping backwards simultaneously over a small frequency band) can measure Doppler shift and resolve the small Doppler shift induced error in the effective height measurement.

In an alternative embodiment, amplifier 403 could be placed before balun 403 for an extra 20 dB of signal to interference ratio. This may be preferred at sites with unusually high interference. However, an FCC license would normally be required again. Also, an RF switch would need to be restored in the Tx path to blank out transmission at frequencies and bands restricted by the FCC and/or user.

For applications requiring increased transmit power, the direct path signal from transmit to receive antenna can be minimized a number of ways, such as by including interference cancellation, by antenna placement and orientation, and by using antennas with different circular polarization response. However, it should be no more difficult to constructively use the direct path signal with controlled coupling to be the source of the mixer LO drive.

Additional advantages of system 400 are that oblique modes are easily incorporated using GPS sourced IPPS trigger to synchronize LO's. Transmission is spectrally clean with no broadband switching transients. Its simplicity and low cost makes it possible to develop for the consumer (HAM) market.

What is claimed is:

1. An ultra low power long range radar system, comprising:
   a broadband high frequency loop antenna configured to simultaneously transmit a transmit signal into the ionosphere and receive a reflected signal from the ionosphere;

a transmit path originating with a local oscillator configured to provide a high frequency sweep transmit signal;

a receive path comprising at least a balun for receiving the reflected signal from the antenna, a mixer for converting the reflected signal to a baseband signal, and a diplexer for diplexing an input signal from the baseband signal;

wherein the transmit signal is delivered to the balun, such that the transmit path is shared with the receive path at the balun and to the antenna;

wherein the balun is configured to divide the transmit signal between the transmit path forward to the antenna and a mixer path to the mixer, and to divide the reflected signal from the antenna between the mixer path and a local oscillator path.

2. The system of claim 1, wherein the power of the transmit signal is sufficiently low to prevent the signal on the transmit path from saturating the signal on the receive path.

3. The system of claim 2, wherein the power of the transmit signal is 100 mW or less.

4. The system of claim 1, wherein the transmit signal has a frequency sweep with a rate in the order of 100 kHz/second.

5. The system of claim 1, further comprising an amplifier on the receive path, configured as both a preamplifier for the received signal and a drive amplifier for the mixer.

6. The system of claim 1, wherein the antenna further has an antenna balun configured to match impedance between the antenna and the transmit path.

7. The system of claim 1, wherein the antenna is made from a loop of triaxial cable, and is configured such that the inner shield is used as the center conductor and the center layer is not used.

8. The system of claim 1, further comprising a processing unit for receiving and digitizing the input signal into input data, and programmed to process the input data.

9. A method of performing ultra low power long range radar system, comprising:

using a broadband high frequency loop antenna to simultaneously transmit a transmit signal into the ionosphere and receive a reflected signal from the ionosphere;

using a local oscillator to provide a high frequency sweep transmit signal;

receiving the reflected signal on a receive path comprising at least a balun for receiving the reflected signal from the antenna, a mixer for converting the reflected signal to a baseband signal, and a diplexer for diplexing an input signal from the baseband signal;

wherein the transmit signal is delivered to the balun, such that the transmit path is shared with the receive path at the balun and to the antenna;

wherein the balun is configured to divide the transmit signal between the transmit path forward to the antenna and a mixer path, and to divide the reflected signal from the antenna between the mixer path and a local oscillator path.

10. The method of claim 9, wherein the power of the transmit signal is sufficiently low to prevent the signal on the transmit path from saturating the signal on the receive path.

11. The method of claim 10, wherein the power of the transmit signal is 100 mW or less.

12. The method of claim 9, wherein the transmit signal has a frequency sweep with a rate in the order of 100 kHz/second.

13. The method of claim 9, further comprising an amplifier on the receive path, configured as both a preamplifier for the received signal and a drive amplifier for the mixer.

14. The method of claim 9, wherein the antenna further has an antenna balun configured to match impedance between the antenna and the transmit path.

15. The method of claim 9, wherein the antenna is made from a loop of triaxial cable, and is configured such that the inner shield is used as the center conductor and the center layer is not used.

16. The method of claim 9, further comprising a processing unit for receiving and digitizing the input signal into input data, and programmed to process the input data.

17. The method of claim 9, wherein the transmit power of the transmit signal is 4 dBm or less.

18. An ultra low power long range radar system, comprising:

a broadband high frequency loop antenna configured to simultaneously transmit a transmit signal into the ionosphere and receive a reflected signal from the ionosphere;

a transmit path originating with a local oscillator configured to provide a high frequency sweep transmit signal;

a receive path comprising at least a balun for receiving the reflected signal from the antenna, a mixer for converting the reflected signal to a baseband signal, and a diplexer for diplexing an input signal from the baseband signal;

wherein the transmit signal is delivered to the balun, such that the transmit path is shared with the receive path at the balun and to the antenna;

wherein the balun is configured to divide the transmit signal between the transmit path forward to the antenna and a mixer path to the mixer, and to divide the reflected signal from the antenna between the mixer path and a local oscillator path; and a processing unit for receiving and digitizing the input signal into input data, and programmed to process the input data.

19. The system of claim 18, wherein the processing unit is programmed to process the input data to provide ionospheric height data.

20. The system of claim 18, wherein the processing unit is programmed to provide output data representing at one of the following: over the horizon radar detection, ground penetrating radar detection, space weather data, asteroid detection.

* * * * *